United States Patent Office 2,802,857
Patented Aug. 13, 1957

2,802,857

METHOD FOR THE PREPARATION OF MALONONITRILE

George Kesslin, Teaneck, N. J., and Leonard Nicholl, Nyack, N. Y., assignors to Kay-Fries Chemicals, Inc., West Haverstraw, N. Y., a corporation of New York No Drawing. Application November 17, 1955, Serial No. 547,568

10 Claims. (Cl. 260—465.2)

The invention relates to a method for the preparation of a nitrile, and more particularly to the production of malononitrile and includes correlated improvements and discoveries, whereby malononitrile production is enhanced.

Malononitrile has previously been prepared by heating a dry mixture of cyanoacetamid and phosphorus pentachloride. However, it was found that such procedure could not be used satisfactorily in plant operation due to rapid, uncontrolled rise in temperature with attendant loss due to polymerization.

Another former procedure placed the reactants, cyanoacetamid and a dehydrating agent as phosphorus oxychloride, in an inert solvent, e. g., ethylene dichloride, and with the addition to the reaction mixture of an alkali metal chloride, as the chlorides of sodium and potassium. The alkali metal chloride allegedly led to the formation of a granular precipitate that could be readily removed by filtering rather than to a viscous mass, which was difficult to filter.

In our attempts to prepare malononitrile by the latter procedure, we have observed that unless the reaction is attended by vigorous agitation, a viscous, tacky mass results, and hence have shown that for large-scale manufacture it would be necessary to use specialized plant equipment.

It is the principal object of this invention to provide a method for the preparation of malononitrile which obviates the disadvantages of former procedures.

Another object of the invention is to provide a method for the production of malononitrile that may be carried out in usual plant equipment and result in a granular mass composed of discrete particles that may be easily filtered.

A further object of the invention is to provide a method for producing malononitrile that may be readily, efficiently and economically practiced in ordinary plant equipment.

A particular object of the invention is the provision of a method for the production of malononitrile, wherein cyanoacetamid is reacted with a dehydrating agent in an inert solvent, i. e., a solvent which is inert with respect to the reactants, containing an adsorbent.

Other objects of the invention will in part be obvious and will in part appear hereinafter.

The invention accordingly comprises the several steps and the relation of one or more of such steps with respect to each of the others thereof, which will be exemplified in the method hereinafter disclosed, and the scope of the invention will be indicated in the claims.

In the practice of the invention, malononitrile is prepared by reacting cyanoacetamid with a dehydrating agent in an inert solvent medium containing an adsorbent. The reaction suitably is conducted at the reflux temperature of the solvent under agitation and for a period that may be from about four to about eight hours. A coarse grained product of discrete particles results, and following cooling to about room temperature, e. g., 20° C. to 25° C., the reaction mixture is filtered and the filter cake washed with portions of the solvent. The filtrate and the washings are combined; the solvent and excess dehydrating agent removed by evaporation, and the malononitrile obtained from the evaporation residue by distillation under vacuum at about 25 mm. of mercury.

As a dehydrating agent, utilization may be made of a member of the group consisting of phosphorus oxychloride, phosphorus pentoxide and phosphorus pentachloride and admixtures thereof. The inert solvent may be a hydrocarbon or a halogenated hydrocarbon in liquid form, with mention more especially of ethylene dichloride, ethylene trichloride, carbon tetrachloride, monochlorobenzene, benzene, toluene, xylene and petroleum ether. The adsorbent may be a diatomaceous earth known commonly under various designations as "Celite," "Diatomite," "Filter-Cel," "Super-Cel" and "HyfloSuper-Cel;" a clay, e. g. bentonite and "Attaclay," which is a hydrated aluminum magnesium silicate; fuller's earth; activated alumina; activated carbon and silica-gel.

As an illustrative embodiment of a manner in which the invention may be practiced, the following examples are presented.

*Example I*

252 gms. cyanoacetamid (3 moles) and 100 gms. "Attaclay," a hydrated aluminum magnesium silicate, are introduced into 400 ml. of ethylene dichloride and the mixture brought to reflux under agitation. 160 ml. of phosphorus oxychloride (about 1.75 moles) are now added throughout a period of one hour. The reflux is continued for an additional period of one and a half hours, whereupon the reaction mixture is cooled to 50° C., and to the cooled mixture there is now added another 20 gms. of "Attaclay." The reflux is then continued for about one and a half hours without any difficulty being encountered with respect to aggregation of the solid or a caking on the vessel walls. The final liquid temperature was 86° C., and during the course of the reaction the liquid temperature dropped from 85° C. to 66° C., but rose again as the evolution of hydrochloric acid subsided. The reaction mixture was cooled to about 20° C., followed by separation of liquid and solid by filtering. There was thus obtained a coarse grained filter cake composed of discrete particles which was washed with two 200 ml. portions of ethylene dichloride. The filtrate and the washings were combined and evaporated to remove solvent and excess phosphorus oxychloride. The residue containing the malononitrile was distilled at a temperature of about 115° C. and under pressure of 25 mm. of mercury, thereby obtaining the malononitrile in purified form. The yield was 115 gms., which is 58.1% of theory based on the cyanoacetamid.

*Example II*

252 gms. of cyanoacetamid and 100 gms. of the diatomaceous earth, known commercially as "Super-Cel,"

were introduced into 725 ml. of ethylene dichloride under agitation, and the mixture thus formed brought to reflux temperature, about 85° C. There were then added over a period of one hour 160 ml. of phosphorus oxychloride, with the reflux being continued for a period of about seven hours. During the reflux period, the temperature of the liquid dropped to about 70° C. and then rose again to about 85° C. when the reaction was substantially complete. The reaction mass was then cooled to about 20° C. and contained a granular product composed of discrete particles which was easily separated from the liquid by filtration. The filter cake thus obtained was washed twice with 200 ml. portions of ethylene dichloride, and following combination of the filtrate and of the washings, the solvent and excess of phosphorus oxychloride was removed by evaporation. The residue containing malononitrile was distilled under vacuum at a temperature of about 115° C. and under a pressure of 25 mm. of mercury with the obtention of malononitrile in purified form. The yield was 113 gms., thus constituting 57.2% of theory based on the cyanoacetamid.

It will be realized that the foregoing examples are not limitative and that comparable results may be obtained when using other adsorbents as fuller's earth, activated alumina and silica-gel, and other inert solvents as ethylene trichloride, benzene and petroleum ether.

The method of the present invention hereinabove described permits of the large-scale manufacture of malononitrile and overcomes the disadvantages of the procedures previously employed. This is accomplished in large measure through the use of an adsorbent such as those described herein, and when such adsorbents are added in sufficient quantity to the reaction mass, the mixture may be stirred throughout the full reaction period without any specialized equipment, such as a heavy-duty agitator, being required. Further, the solid material which is formed during the reaction is in granular form and composed of discrete particles. Hence, the solid and liquid may be readily separated by filtration since there is not any clinging to the walls of the reaction vessel and there is a total absence of a viscous, tacky mass.

Moreover, the yields obtained based on the weight of cyanoacetamid used were from 57 to 63 percent of theoretical. As indicated above, the utilization of the adsorbent has made it possible to produce malononitrile on a plant scale without resorting to other than the usual or ordinary plant equipment. Additionally, the employment of the adsorbents leads to an increase in the space yield due to reduction in the amount of solvent required.

It may be added that the solid formed is well dispersed, consists of discrete particles, is free of tackiness, may be easily agitated and readily separated from liquid by filtration.

The malononitrile may also be separated from the reaction mixture in crystalline form by treating the mixture with a compound having a weakly basic reaction, for example, ammonia, dry sodium carbonate and sodium acetate. The reaction mixture thus treated is then filtered and the filter cake washed with the inert solvent that has been used. The filtrate and the washings are evaporated to remove solvent and the residue, which is the crude malononitrile, is cooled, followed by the addition thereto of a crystallization solvent, for example, a low molecular weight monohydric aliphatic alcohol, specifically isopropyl alcohol. The solution is then further cooled, whereupon malononitrile separates in crystalline form. This crystallization procedure does not constitute part of the present invention and is fully described and claimed in the application of Alvin C. Flisik and Leonard Nicholl filed of even date herewith, Serial No. 547,561.

It will thus be seen that the objects set forth above, among those made apparent from the preceding description, are efficiently attained and, since certain changes may be made in carrying out the above method without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A method for the production of malononitrile, which comprises reacting cyanoacetamid with a dehydrating agent selected from the group consisting of phosphorus oxychloride, phosphorus pentoxide, phosphorus pentachloride and admixtures thereof in an inert solvent containing a solid adsorbent, under the influence of heat at the reflux temperature of the solvent.

2. A method for the production of malononitrile, which comprises reacting cyanoacetamid with a dehydrating agent selected from the group consisting of phosphorus oxychloride, phosphorus pentoxide, phosphorus pentachloride and admixtures thereof in an inert solvent containing a diatomaceous earth, under the influence of heat at the reflux temperature of the solvent.

3. A method for the production of malononitrile, which comprises reacting cyanoacetamid with a dehydrating agent selected from the group consisting of phosphorus oxychloride, phosphorus pentoxide, phosphorus pentachloride and admixtures thereof in an inert solvent containing a hydrated aluminum magnesium silicate, under the influence of heat the the reflux temperature of the solvent.

4. A method for the production of malononitrile, which comprises reacting cyanoacetamid with a dehydrating agent selected from the group consisting of phosphorus oxychloride, phosphorus pentoxide, phosphorus pentachloride and admixtures thereof in an inert solvent containing activated alumina, under the influence of heat at the reflux temperature of the solvent.

5. A method for the production of malononitrile, which comprises reacting cyanoacetamid with a dehydrating agent selected from the group consisting of phosphorus oxychloride, phosphorus pentoxide, phosphorus pentachloride and admixtures thereof in ethylene dichloride containing a solid adsorbent at a temperature of about 85° C.

6. A method for the production of malononitrile, which comprises reacting cyanoacetamid with a dehydrating agent selected from the group consisting of phosphorus oxychloride, phosphorus pentoxide, phosphorus pentachloride and admixtures thereof in ethylene dichloride containing a diatomaceous earth at a temperature of about 85° C.

7. A method for the production of malononitrile, which comprises reacting cyanoacetamid with a dehydrating agent selected from the group consisting of phosphorus oxychloride, phosphorus pentoxide, phosphorus pentachloride and admixtures thereof in ethylene dichloride containing a hydrated aluminum magnesium silicate at a temperature of about 85° C.

8. A method for the production of malononitrile, which comprises reacting cyanoacetamid with a dehydrating agent selected from the group consisting of phosphorus oxychloride, phosphorus pentoxide, phosphorus pentachloride and admixtures thereof in an inert solvent containing a solid adsorbent, under the influence of heat at the reflux temperature of the solvent, then cooling to about room temperature, separating liquid and solid, and distilling the liquid under vacuum with obtention of malononitrile.

9. A method for the production of malononitrile, which comprises reacting cyanoacetamid with a dehydrating agent selected from the group consisting of phosphorus oxychloride, phosphorus pentoxide, phosphorus pentachloride and admixtures thereof in an inert solvent containing a solid adsorbent, under the influence of heat at the reflux temperature of the solvent, then cooling to a temperature of about 20° C., separating liquid and solid, and distilling the liquid under vacuum with obtention of malononitrile.

10. A method for the production of malononitrile, which comprises reacting cyanoacetamid with a dehydrating agent selected from the group consisting of phosphorus oxychloride, phosphorus pentoxide, phosphorus pentachloride and admixtures thereof in an inert solvent containing a solid adsorbent, under the influence of heat at the reflux temperature of the solvent, then cooling to a temperature of about 20° C., separating liquid and solid, and distilling the liquid at a temperature of about 115° C. and at a pressure of about 25 mm. of mercury with obtention of malononitrile.

References Cited in the file of this patent

UNITED STATES PATENTS 2,389,217   Surrey _____ Nov. 20, 1945